United States Patent [19]

Menge, Sr.

[11] Patent Number: 5,074,829
[45] Date of Patent: Dec. 24, 1991

[54] COMBINATION CHAIN & GEAR REDUCING DEVICE

[76] Inventor: Theodore L. Menge, Sr., 4126 Finley Dr., Shreveport, La. 71105

[21] Appl. No.: 600,182

[22] Filed: Oct. 19, 1990

[51] Int. Cl.[5] ............................................. F16H 7/06
[52] U.S. Cl. .................................. 475/182; 475/330
[58] Field of Search .............. 475/167, 182, 220, 275, 475/276, 311, 330, 339; 474/85, 88

[56] References Cited

U.S. PATENT DOCUMENTS

| | | | |
|---|---|---|---|
| 846,086 | 3/1907 | Bouvier | 475/182 |
| 2,122,330 | 6/1938 | Stenzy | 475/182 |
| 2,140,790 | 12/1938 | Davis | 475/182 |
| 2,197,014 | 4/1940 | Stenzy | 475/182 |
| 2,210,598 | 8/1940 | Pepper | 475/182 X |
| 2,312,908 | 3/1943 | Ibanez | 475/182 |
| 2,582,620 | 1/1952 | Colucci | 475/182 |
| 2,653,490 | 9/1953 | Testori | 475/182 |
| 3,130,608 | 4/1964 | Moran | 475/182 |
| 3,429,200 | 2/1969 | Green | 475/330 |
| 3,979,971 | 9/1976 | Generke et al. | 475/182 X |
| 4,044,633 | 8/1977 | Lee | 475/182 |
| 4,048,871 | 9/1977 | Fyock | 475/182 X |

FOREIGN PATENT DOCUMENTS

62-137446  6/1987  Japan ................................. 475/339

*Primary Examiner*—Leslie A. Braun
*Assistant Examiner*—Mattew Stavish
*Attorney, Agent, or Firm*—John M. Harrison

[57] ABSTRACT

A combination chain and gear reducing device which includes a housing, an input drive system characterized by an input shaft having one end projecting from one end of the housing and the opposite end rotatably terminating in one end of an output shaft, a spur and pinion gear mounted on the input shaft, a pair of spur gears in oppositely-disposed relationship on the spur and pinion gear and carrying corresponding auxiliary spur gears, a disc rotatably mounted on the output shaft and receiving the spur gears and auxiliary spur gears, and an output shaft spur gear keyed to the output shaft and rotatably engaging each of the auxiliary spur gears. The spur gears and auxiliary spur gears are rotatably seated in pairs on separate spur gear shafts which are press-fitted in spaced relationship along a first diameter of the disc. An output drive system is located in the housing on the opposite side of the disc from the input drive system and includes an output shaft sprocket keyed to the output shaft and connected by means of a leaf chain to a pair of double sprockets rotatably secured to the disc along a second diameter which is ninety degrees disposed from the first diameter. Another leaf chain extends from the double sprockets to a fixed sprocket which is bolt to the housing. Driving of the disc and the output shaft by operation of the input and output drive systems creates a high torque, low speed mechanical advantage at the output shaft.

28 Claims, 4 Drawing Sheets

COMBINATION CHAIN & GEAR REDUCING DEVICE

BACKGROUND OF THE INVENTION

1. Field of the Invention

This invention relates to gear reducing devices and more particularly, to a combination chain and gear reducing device for application in sawmills and the like, which device is characterized by an input drive system and an output drive system located in a chamber or housing and separated by a rotating disc. The input drive system of the combination chain and gear reducing device includes an input shaft having one end rotatably seated in axial alignment in one end of an output shaft and extending from the housing and driven by an electric motor and belt combination. A spur and pinion gear is secured to or shaped integrally with the input shaft and engages a pair of oppositely-disposed, larger spur gears, each of which is provided with a fixed auxiliary spur gear, which spur gears and auxiliary spur gears ar rotatably mounted in spaced relationship on the disc. The auxiliary spur gears mesh with an output shaft spur gear that is keyed to the output shaft, which rotates independently of the input shaft, and, together with the spur gears, drive the disc. The auxiliary spur gears are rotatably mounted along with the spur gears, respectively, on a pair of spur gear shafts which are press-fitted in spaced relationship along a diameter of the rotating disc, which is rotatably mounted on the output shaft. Accordingly, rotation of the input shaft at a selected speed effects planetary rotation of the spur gears on the spur and pinion gear and the auxiliary spur gears on the output shaft spur gear. This rotation of the spur gears around the spur and pinion gear also effects rotation of the disc on the output shaft in the opposite direction from the direction of rotation of the input shaft.

The output drive system of the combination chain and gear reducing device includes an output shaft sprocket keyed to the output shaft, a fixed sprocket spaced from the output shaft sprocket and mounted in fixed relationship to the housing and a pair of double sprockets rotatably mounted on the disc in spaced relationship and along a diameter in ninety degree disposed relationship with respect to the auxiliary spur gears, respectively. A fixed sprocket leaf chain connects the fixed sprocket to a common set of teeth in the double sprockets and an output shaft sprocket leaf chain attaches the output shaft sprocket to an adjacent set of teeth in the double sprockets, respectively. Accordingly, rotation of the disc by operation of the input drive system effects rotation of the output shaft sprocket and the output shaft, since the output shaft sprocket is keyed to the output shaft. Rotation of the double sprockets drives the output shaft at a speed which is determined by the respective gear ratios of the spur and pinion gear, spur gears, auxiliary spur gears, output shaft spur gear, output shaft sprocket, fixed sprocket and double sprockets, respectively. The torque applied to the output shaft depends upon the relative number of teeth provided on the fixed sprocket and output shaft sprocket, respectively, located in the output drive system.

2. Description of the Prior Art

Various devices are known in the art for achieving a mechanical advantage in gearing, power transmission, speed reduction and the like. Early U.S. Pat. No. 846,086, dated Mar. 5, 1907, to G. E. Bouvier, et al, entitled "Gearing", details a differential driving connection for decreasing the speed of bobbins in a fly-frame as the bobbins are filled and increased in diameter, in order to assure that the yarn on the bobbin will be wrapped with a desired degree of tension. U.S. Pat. No. 2,140,790, dated Dec. 20, 1938, to I. R. Davis, is entitled "Power Transmission". The power transmission mechanism is designed to develop maximum power using a pair of bevel gears coupled to a system of spur gears. U.S. Pat. No. 2,210,598, dated Aug. 6, 1940, to R. K. Pepper, et al, details a "Power Clutch Unit" adapted for use in connection with heavy duty, slow speed mechanisms such as Caterpillar tractors, power-operated shovels, trucks and the like. U.S. Pat. No. 2,312,908, dated Mar. 2, 1943, to F. R. Ibanez, details a "Mechanism for Transmitting Power" which includes chain-connected sprockets and meshing gears for speed reduction purposes. "Variable-Speed Gearing" is detailed in U.S. Pat. No. 2,582,620, dated Jan. 15, 1952, to G. Colucci. The device includes one pair of variable diameter pulleys driven by a V-belt or chain where the tension is maintained in the chain or V-belt by the centrifugal force generated by rotation of the pulley system mounted on shafts carried by supports articulated to the axis of rotation of the pulley system. U.S. Pat. No. 2,653,490, dated Sept. 29, 1953, to E. Testori, details a "Progressive Variable Speed Drive Capable of Reverse Rotation". The system includes meshing gears and a V-belt and is designed to provide a progressive variable speed drive, by which it is possible to reach zero speed on the driven shaft while the driving shaft rotates at a selected speed. Reversal of the direction of rotation is also possible with the system. U.S. Pat. No. 3,130,608, dated Apr. 28, 1964, to L. H. Moran, details a "Chain-Type Speed Reducer" for transmitting power between rotatable members of the reducer and materially reducing the drive from a drive shaft to a driven shaft. The reducer employs a lever driven by the drive shaft for operating chains or the like circumferentially around a fixed sprocket to reduce the speed of the driven shaft. A "Variable Speed Power Transmission for Small Vehicles and The Like" is detailed in U.S. Pat. No. 4,048,871, dated Sept. 20, 1977, to N. G. Gyock. The transmission system includes primary and secondary transmissions connected in series, wherein a forward speed having a variable output depends upon the load placed on the input shaft to the primary transmission. The secondary transmission functions in one mode to reverse the direction of the output shaft, while the primary transmission operates to provide a variable gear ratio, depending upon the load placed upon the input shaft to the primary transmission.

It is an object of this invention to provide a combination chain and gear reducing device which utilizes an input shaft rotatably seated in one end of an output shaft, meshing gears engaging the input shaft and output shaft on the input side of a rotating disc, and chain-connected sprockets having a different number of teeth, connected to the output shaft on the opposite or output side of the disc, to create a mechanical advantage at the output shaft.

Another object of this invention is to provide a combination chain and gear reducing device which utilizes an input shaft rotatably and linearly terminating in an output shaft coupled to a system of gears located on the input side of a heavy disc or flywheel, to define an input drive system and sprockets connected by chains and having a different number of teeth and located on the opposite side of the flywheel to define an output system, for driving the output shaft at a selected speed and torque.

Yet another object of this invention is to provide a combination chain and gear reducing device which is characterized by an input drive mechanism having an input shaft carrying a spur and pinion gear that meshes with a pair of matching, oppositely-disposed spur gears and auxiliary spur gears which are, in turn, rotatably attached to a rotating disc and mesh with an output shaft spur gear keyed to an output shaft rotatably receiving the input shaft in axial alignment. The output drive mechanism includes a pair of spaced double sprockets rotatably mounted on the disc and connected by means of leaf, or silent chains to an output shaft sprocket having a first selected number of teeth and keyed to the output shaft and a fixed sprocket having a second selected number of teeth and secured to the housing of the combination chain and gear reducing device, respectively, for creating low speed, high torque operation of the output shaft.

A still further object of this invention is to provide a new and improved combination chain and gear reducing device which is characterized by a housing, an input shaft carrying a spur and pinion gear and journalled for rotation in one end of the housing and an output shaft journalled for rotation in the opposite end of the housing, one end of which input shaft is rotatably and axially seated in a corresponding end of the output shaft, and further including a disc or flywheel rotatably mounted on the output shaft and fitted with a pair of auxiliary spur gears for meshing with an output shaft spur gear keyed to the output shaft and a pair of spur gears meshing with the spur and pinion gear, for driving the disc at a speed proportional to the speed of the input shaft. The disc is further provided with a pair of double sprockets connected by means of leaf chains to an output shaft sprocket keyed to the output shaft and a fixed sprocket having a different number of teeth from the output shaft sprocket and located on the output side of the disc, to determine the output shaft torque.

SUMMARY OF THE INVENTION

These and other objects of the invention are provided in a new and improved combination chain and gear reducing device which is characterized in a preferred embodiment by a cylindrical housing having an input shaft journalled for rotation in one end and an output shaft journalled for rotation in the opposite end, which input shaft is rotatably and linearly seated in one end of the output shaft; a disc rotatably mounted on the output shaft; a spur and pinion gear mounted on the input shaft and meshing with oppositely-disposed spur gears rotatably mounted along with a pair of auxiliary spur gears, on a pair of spur gear shafts which are press-fitted into the disc in spaced relationship. The auxiliary spur gears are, in turn, meshed with an output shaft spur gear keyed to the output shaft, to complete an input drive system for effecting a rotational speed of the disc which is proportional to the rotational speed of the input shaft. The torque-producing output drive system of the combination chain and gear reducing device is characterized by a pair of double sprockets rotatably mounted on the rotating disc in spaced, 90 degree disposed relationship with respect to the auxiliary spur gears and fitted with leaf chains for connection to an output shaft sprocket having a first selected number of teeth and keyed to the output shaft, and a fixed sprocket having a second selected number of teeth and bolted to the combination chain and gear reducing housing, respectively. Operation of the input shaft at a selected rotational speed effects rotation of the disc, the output shaft sprocket and the output shaft at much reduced speeds, with a torque which is determined by the respective number of teeth located on the fixed sprocket and the output shaft sprocket.

BRIEF DESCRIPTION OF THE DRAWINGS

The invention will be better understood by reference to the accompanying drawings, wherein.

DESCRIPTION OF THE PREFERRED EMBODIMENTS

Figures 1, 5, 6:
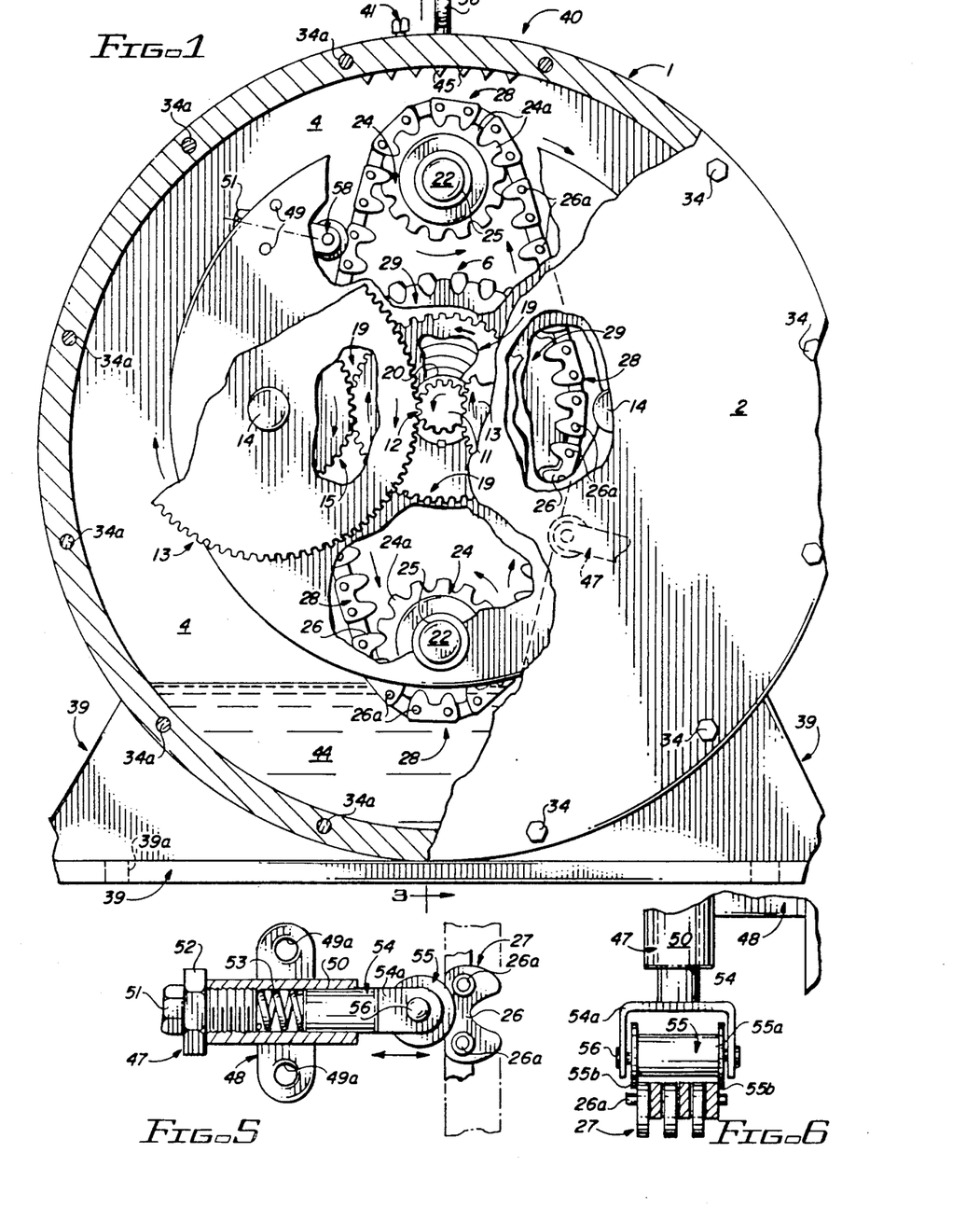
FIG. 1 is a front view, partially in section, of a preferred embodiment of the combination chain and gear reducing device of this invention.
FIG. 5 is a side sectional view of a preferred fixed sprocket chain tensioner for tensioning the corresponding chain in the combination chain and gear reducing device illustrated in FIGS. 1-4.
FIG. 6 is a top view of the bottom portion of the fixed sprocket chain tensioner illustrated in FIG. 5.
Figures 3, 8, 9:
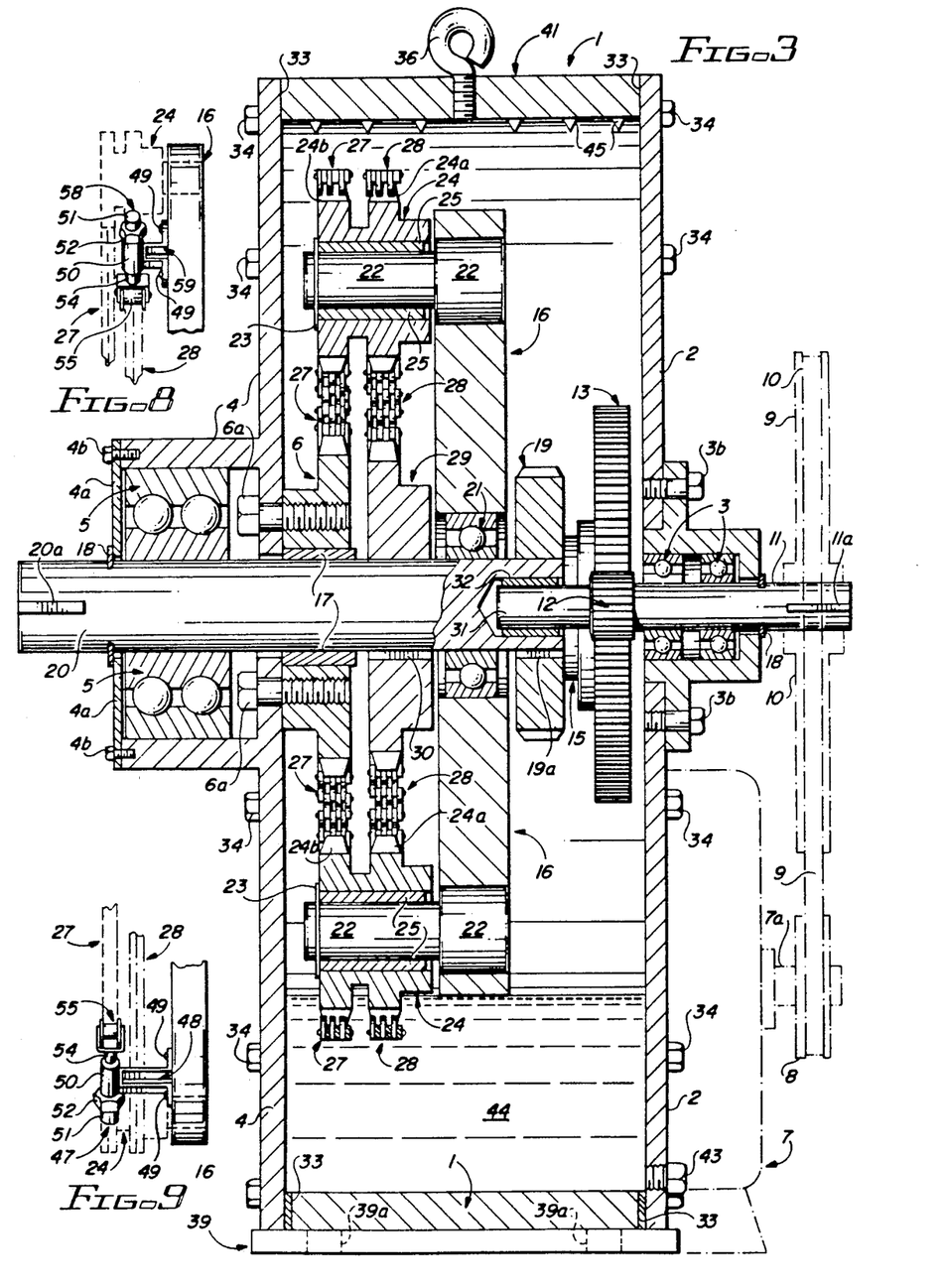
FIG. 3 is a sectional view taken along line 3—3 of the combination chain and gear reducing device illustrated in FIG. 1.
FIG. 8 is perspective view of a preferred mounting configuration for an output chain tensioner of this invention.
FIG. 9 is an exploded simplified view of the combination chain and gear reducing device illustrated in FIGS. 1-4.
Figure 4:
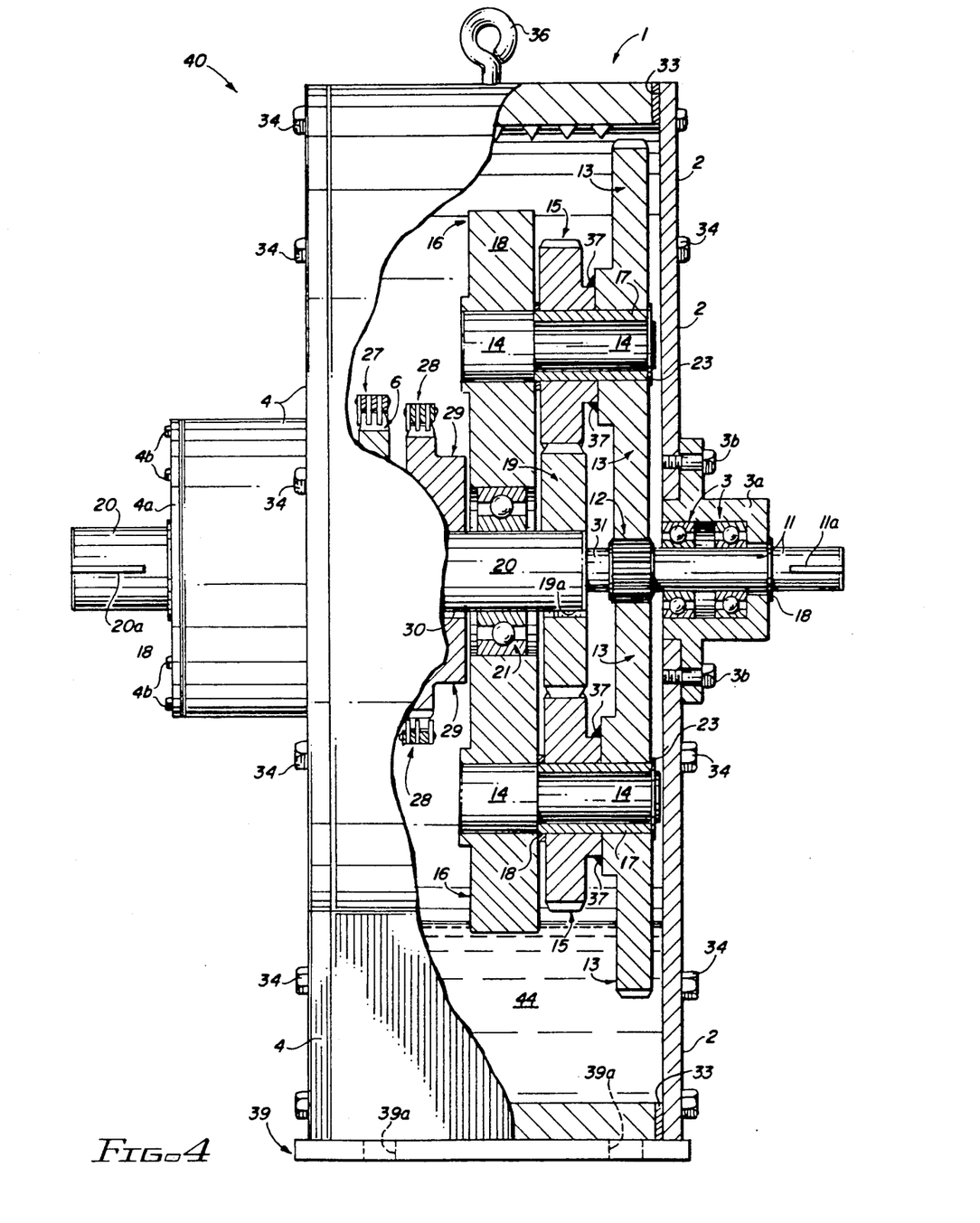
FIG. 4 is a partial sectional view taken along line 4—4 of the combination chain and gear reducing device illustrated in FIG. 2.

Referring initially to FIGS. 1 and 4 of the drawings, the combination chain and gear reducing device of this invention is generally illustrated by reference numeral 40. The combination chain and gear reducing device 40 includes a cylindrical housing 1, fitted with an optional lifting hook 36 on the top thereof and enclosed at the front by an input cover plate 2 and at the rear by an output cover plate 4. Gaskets 33 serve to seal the input cover plate 2 and the outplate cover plate 4 on the housing 1, in order to enclose a pool of oil 44 in the lower portion of the housing 1. A base 39 is mounted on the lower portion of the housing 1 to maintain the combination chain and gear reducing device 40 in an upright position, as illustrated. As further illustrated in FIG. 1, an oil filler plug 41 is threadably seated in the housing 1 for introducing the oil 44 into the housing 1. In a preferred embodiment of the invention the circular facing edges of the housing 1 are fitted with internally-threaded cover plate bolt apertures 34a, for receiving corresponding cover plate bolts 34 and removably securing the input cover plate 2 and the output cover plate 4 on opposite ends of the housing 1. An input shaft 11 is journalled for rotation in the input cover plate 2 of the housing 1 and extends through a pair of input shaft bearings 3, located in a bearing housing 3a, as further illustrated in FIG. 4. A snap ring 18 seats in a groove (not illustrated) provided in the input shaft 11 for rotatably securing the input shaft 11 in the bearing housing 3a. Bearing housing bolts 3b serve to maintain the bearing housing 3a in position on the input cover plate 2 and protect the spaced input shaft bearings 3. The output cover plate 4 located on the opposite end of the housing 1 includes a projecting center portion which rotatably receives an output shaft 20, extending through an output shaft bearing 5, as illustrated in FIG. 3. A cover plate 4a closes the front end of the center portion projection and plate bolts 4b serve to removably secure the cover plate 4a on the projecting portion of the output cover plate 4, as further illustrated in FIG. 4. An output shaft key 20a is seated in the extending portion of the output shaft 20 for coupling a load (not illustrated) to the output shaft 20 in driving relationship.

As further illustrated in FIG. 3, an oil drain plug 43 is threadably seated in the lower portion of the input cove plate 2 for draining the oil 44 from the housing 1. Furthermore, an electric motor 7 is illustrated in phantom in close proximity to the housing 1 and includes a motor shaft 7a, which receives a motor shaft sheave 8. An input shaft sheave 10 is aligned with the motor shaft sheave 8 and fastened to the extending end of the input shaft 11 by means of an input shaft key 11a and a belt 9 connects the input shaft sheave 10 to the motor shaft sheave 8, as further illustrated in phantom in FIG. 3. Accordingly, operation of the electric motor 7 at a selected speed drives the input shaft 11 at a corresponding speed to operate the combination chain and gear reducing device.

Referring again to FIGS. 1, 3, 4 and 9 of the drawings, the input drive system of the chain and gear reducing device 40 is characterized by a spur and pinion gear 12 having 16 teeth and secured to o formed integrally with the input shaft 11 inside the housing 1. An input shaft extension 31 defines that portion of the input shaft 11 which projects beyond the spur and pinion gear 12 and extends axially into a shaft extension bushing 32, provided in the output shaft 20, as hereinafter further described. A pair of spur gears 13, each having 96 teeth adapted for meshing with the teeth on the spur and pinion gear 12 are positioned on the spur and pinion gear 12 in oppositely-disposed relationship, as further illustrated in FIG. 4. Each of the spur gears 13 is rotatably mounted on a separate spur gear shaft 14 by means of a shaft clip 23, the opposite ends of which spur gear shafts 14 are press-fitted into corresponding shaft openings 35 of a rotating disc 16, which is, in turn, rotatably mounted on the output shaft 20 by means of a disc bearing 21. A separate auxiliary spur gear 15 is welded by means of welds 37, or otherwise attached to or integrally formed with each of the spur gears 13 between the spur gears 13 and the rotating disc 16, as further illustrated in FIG. 4. Each of the auxiliary spur gears 15 is characterized by 44 teeth, which teeth mesh with corresponding teeth in the output shaft spur gear 19, attached to the output shaft 20 by means of a spur gear key 19a. In a preferred embodiment of the invention the output shaft spur gear 19 has 40 teeth adapted for meshing with the 44 teeth of the auxiliary spur gear 15 in driving relationship. Accordingly, from a consideration of the input drive system of the combination chain and gear reducing device 40, it can be seen by reference to FIGS. 1 and 4 that rotation of the input shaft 11 at a speed determined by the electric motor 7 and the relative sizes of the motor shaft sheave 8 and input shaft sheave 10, also rotates the spur and pinion gear 12, which causes the spur gears 13 to traverse the spur and pinion gear 12 in oppositely-disposed, planetary fashion. This planetary motion of the spur gears 13 in concert causes the auxiliary spur gears 15 to rotate and traverse the output shaft spur gear 19 and this effects rotation of the rotating disc 16 in the opposite direction from the input shaft 11. For example, if the number of teeth provided on the output shaft spur gear 19 is the same as the number of teeth on the auxiliary spur gears 15, then the rotating disc 16 rotates one revolution for each revolution of both the output shaft spur gear 19 and the auxiliary spur gears 15. Accordingly, it is understood that the respective gear ratios provided in the spur and pinion gear 12, the spur gears 13, the auxiliary spur gears 15 and the output shaft spur gear 19 determine the rotational speed of the rotating disc 16 and the resulting rotational speed of the output shaft 20 is much less than that of the input shaft 11, as further hereinafter described.

Figure 2:
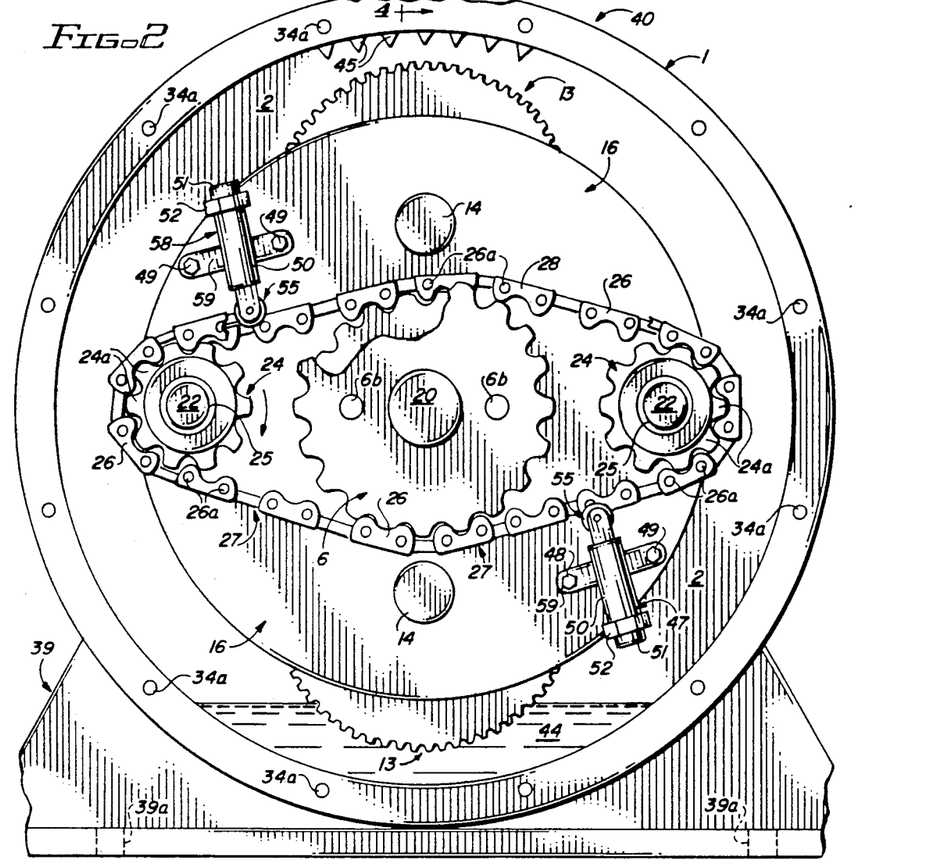
FIG. 2 is a rear view of the combination chain and gear reducing device illustrated in FIG. 1, with the rear housing removed.
Figure 7:
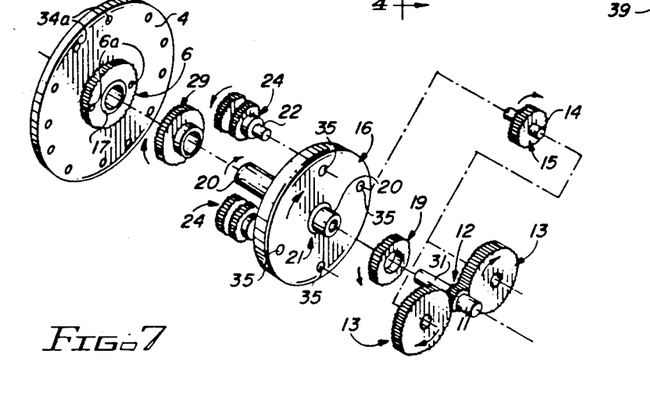
FIG. 7 is a perspective view of a preferred mounting configuration for the fixed sprocket chain tensioner illustrated in FIGS. 5 and 6.

The output drive system of the combination chain and gear reducing device 40 is detailed in FIGS. 2, 3 and 7 of the drawings and is designed to determine the torque of the output shaft 20. FIGS. 2 and 3 more particularly illustrate an output shaft sprocket 29 having 19 teeth and fixedly attached to the output shaft 20 by means of an output shaft sprocket key 30, as illustrated in FIG. 3. Furthermore, a fixed sprocket 6, having 20 teeth, is attached to the output cover plate 4 of the housing 1 by means of sprocket mount bolts 6a, which extend through corresponding mount bolt apertures 6b, provided in the fixed sprocket 6, is more particularly illustrated in FIGS. 2 and 7. The fixed sprocket 6 is provided with a fixed sprocket bushing 17 for rotatably receiving the output shaft 20, as illustrated in FIGS. 3 and 7. A pair of double sprockets 24 are mounted by means of double sprocket bushings 25 on a pair of double sprocket shafts 22 across a diameter of the rotating discs 16, in 90 degree relationship with respect to the auxiliary spur gears 15, respectively. Each of the double sprockets 24 is characterized by a separate set of 10 teeth positioned in spaced relationship and each double sprocket shaft 22 is press-fitted in corresponding shaft openings 35 in the rotating disc 16, as further illustrated in FIGS. 3 and 7. The 10 front teeth 24a located on each double sprocket 24 are positioned in alignment with the output shaft sprocket 29, which includes 19 teeth, while the 10 rear teeth 24b located in the double sprocket 24 are aligned with the 20 teeth in the fixed sprocket 6. A fixed sprocket leaf chain 27 (or a suitable roller chain) extends around the rear teeth 24b of the double sprocket 24 and correspondingly aligned teeth in the fixed sprocket 6, as further illustrated in FIGS. 2 and 3. Similarly, an output shaft sprocket leaf chain 28 (or roller chain) extends around the front teeth 24a located in the double sprocket 24 and the correspondingly aligned teeth in the output shaft sprocket 29, as illustrated in FIG. 3. Accordingly, it will be appreciated that rotation of the rotating disc 16 at a speed determined by the rotational speed of the input shaft 11 and the respective gear ratios of the spur gears 13, auxiliary spur gears 15 and output shaft spur gear 19, causes the output shaft sprocket 29 and the output shaft 20 to rotate at a reduced speed, driven by the double sprockets 24. This output shaft rotation is effected at a specified torque a the fixed sprocket leaf chain 27 and the output shaft sprocket leaf chain 28 traverse the rear teeth 24b and the front teeth 24a in the double sprocket 24 and the corresponding teeth (which are unequal in number) in the fixed sprocket 6 and output shaft sprocket 29, respectively.

Referring now to FIGS. 2, 5, 6 and 8, in a preferred embodiment of the invention a fixed sprocket chain tensioner 47 is attached to the rotating disc 16 by means of a corresponding fixed sprocket chain tensioner bracket 48 and bracket bolts 49, projecting through bolt apertures 49a located in the fixed sprocket chain tensioner bracket 48. The fixed sprocket chain tensioner 47 is characterized by a cylindrical tensioner barrel 50 having internal threads and fitted with an adjusting bolt 51 and lock nut 52 at one end, as further illustrated in FIG. 5. A coil spring 53 is located in the hollow tensioner barrel 50 adjacent to the end of the adjusting bolt 51 and a roller mount 54 lies adjacent the opposite end of the spring 53 inside the tensioner barrel 50 and extends to define a mount bracket 54a, which rotatably receives a roller 55. The roller 55 is further characterized by spool 55a, having spool flanges 55b on the ends thereof mounting on a roller pin 56 and engaging the individual chain links 26 of the fixed sprocket leaf chain 27 and tensioning the fixed sprocket leaf chain 27, as further illustrated in FIGS. 5 and 6. Similarly, an output shaft sprocket chain tensioner 58 is bolted to the opposite side of the rotating disc 16 by means of bracket bolts 49, securing a corresponding output shaft sprocket chain tensioning bracket 59. The corresponding roller 55 engages respective chain links 26 on the output shaft sprocket leaf chain 28, to tension the output shaft sprocket leaf chain 28, as illustrated in FIG. 2. It will be appreciated from a consideration of FIG. 2 that the fixed sprocket chain tensioner 47 and output shaft sprocket chain tensioner 58 operate to tension the fixed sprocket leaf chain 27 and output shaft sprocket leaf chain 28, respectively, since the respective double sprockets 24 are operating in the clockwise direction as viewed in FIG. 2, to create chain sag on that portion of the respective chain links 26 which are not in tension.

Referring again to FIGS. 3, 4 and 7 of the drawings, as the input shaft 11 is viewed from the front and is driven in the counterclockwise direction by the electric motor 7, the motor shaft sheave 8, input shaft sheave 10 and belt 9, illustrated in FIG. 3, the spur and pinion gear 12 also rotates in the counterclockwise direction, as indicated by the arrow. Counterclockwise rotation of the input shaft 11 and the spur and pinion gear 12 causes the spur gears 13, the teeth of which are engaged with the teeth of the spur and pinion gear 12, to rotate in the clockwise direction, as further illustrated by the arrows in FIG. 1. Since the two auxiliary spur gears 15 are fixed to the spur gears 13, respectively, and are mounted on the spur gear shafts 14, the auxiliary spur gears 15 both also rotate on the spur gear shafts 14 in the clockwise direction, with the spur gears 13, respectively. Furthermore, the auxiliary spur gears 15 engage the output shaft spur gear 19 on opposite sides and rotate in concert around the output shaft spur gear 19. Moreover, as heretofore described, the auxiliary spur gears 15 are rotatably mounted with the spur gears 13 on separate spur gear shafts 14 the ends of which are rigidly seated in spaced shaft openings 35, located along a common diameter in the rotating disc 16. As further heretofore described, the rotating disc 16 is rotatably mounted on the output shaft 20 by means of a disc bearing 21 and rotates along with the auxiliary spur gears 15, which rotate in a clockwise path with the spur gears 13, about the input shaft 11 and input shaft extension 31. This clockwise rotation of the rotating disc 16 also effects counterclockwise rotation of the spaced double sprockets 24, since the double sprockets 24 are connected by means of the output shaft sprocket leaf chain 28 and the fixed sprocket leaf chain 27, to the output shaft sprocket 29 and fixed sprocket 6, respectively. The output shaft sprocket 29 thus also rotates in the clockwise direction to drive the output shaft 20, since the former is keyed to the latter while the fixed sprocket 6 is bolted to the output cover plate 4. A desired torque is created in the rotating output shaft 20 by providing a different number of teeth in the output shaft sprocket 29 and fixed sprocket 6, as heretofore described. By way of example, the output shaft sprocket 29 has 19 teeth, while the fixed sprocket 6 is provided with 20 teeth, which disparity creates a most preferred torque in the output shaft 20.

It will be appreciated from further consideration of FIG. 1 that the double sprockets 24 must each contain the same number of teeth, since the double sprockets 24 are connected both to the fixed sprocket 6 and the output shaft sprocket 29 by the fixed sprocket leaf chain 27 and the output shaft sprocket leaf chain 28, respectively, and this gear ratio is a factor in determining the desired torque at the output shaft 20. Accordingly, for each revolution of the fixed sprocket leaf chain 27 around the fixed sprocket 6, the double sprocket 24 rotates two revolutions on the double sprocket shaft 22. Furthermore, the output shaft sprocket 29 must have more or less teeth, and most preferably, one more or one less tooth, than the fixed sprocket 6, as described above, in order to effect the desired torque on the output shaft 20 as the combination chain and gear reducing device 40 operates. Consequently, if the output shaft sprocket 29 has 20 teeth and the fixed sprocket 6 has 19 teeth, then the output shaft sprocket 29 will rotate in the clockwise direction at a speed proportional to the counterclockwise rotational speed of the input shaft 11 and rotating disc 16 and with a optimum torque which is proportional to the difference in the number of teeth located on the output shaft sprocket 29 and the fixed sprocket 6. Considering the chain and gear reducing device 40 illustrated in the drawings and having the gear and sprocket components described above, the motor shaft sheave 8 and input shaft sheave 10 are chosen such that the 1750 rpm rotation of the motor shaft 7a causes the input shaft 11 to rotate at a speed of 337.5 rpm. This causes the rotating disc 16 to turn at a speed of 100 rpm and the input shaft 20 to turn at a speed of 4.5 rpm at high torque. If the number of teeth provided on the output shaft sprocket 29 and fixed sprocket 6 are increased to 40 and 39, respectively, then the speed of the output shaft 20 drops to 2.25 rpm, with increased torque.

Referring again to FIGS. 1-4 of the drawings, in another preferred embodiment of the invention a series of oil drip tips 45 are provided in the top of the housing 1. The level of oil 44 in the housing 1 is maintained such that the spur gears 13, a portion of the double sprockets 24 and the corresponding segments of the fixed sprocket leaf chain 27 and output shaft sprocket leaf chain 28 which engage the front teeth 24a and rear teeth 24b of the double sprockets 24, respectively, are periodically dipped into the oil 44. This oil is splashed onto the oil drip tips 45 and drips onto the various components of the chain and gear reducing device 40, during operation.

While the preferred embodiments of the invention have been described above it will be recognized and understood that various modifications may be made in the invention and the appended claims are intended to cover all such modifications which may fall within the spirit and scope of the invention.

Having described my invention with the particularity set forth above, what is claimed is:

1. A combination chain and gear reducing device comprising a housing; an input shaft journalled for rotation in one end of said housing; an output shaft journalled for rotation in the opposite end of said housing, with one end of said input shaft disposed for linear rotation in one end of said output shaft; a disc rotatably mounted on said output shaft inside said housing; input gear means disposed in said housing and engaging said input shaft, said output shaft and said disc, whereby said disc is rotatably driven on said output shaft responsive to operation of said input gear means; a first sprocket fixedly carried by said output shaft; a second sprocket fixedly carried by said housing, said second sprocket having a different number of teeth from said first sprocket and rotatably receiving said output shaft; at least one double sprocket rotatably carried by said disc; and a pair of chains connecting said double sprocket to said first sprocket and said second sprocket respectively, whereby said disc, said first sprocket and said output shaft are driven at a torque determined by said different number of teeth on said first sprocket and said second sprocket, responsive to rotation of said input shaft.

2. The combination chain and gear reducing device of claim 1 wherein said input gear means further comprises a spur and pinion gear fixedly attached to said input shaft; a pair of spur gears engaging said spur and pinion gear for planetary travel about said spur and pinion gear; a pair of auxiliary spur gears rotatably carried by said disc in spaced relationship, said auxiliary spur gear fixedly carried by said spur gears, respectively; and an output shaft spur gear fixedly carried by said output shaft, with said auxiliary spur gears engaging and traversing said output shaft spur gear in oppositely-disposed relationship, for rotatably driving said disc on said output shaft.

3. The combination chain and gear reducing device of claim 1 wherein said first sprocket includes at least one more tooth than said second sprocket.

4. The combination chain and gear reducing device of claim 3 wherein said input gear means further comprises a spur and pinion gear fixedly attached to said input shaft; a pair of spur gears engaging said spur and pinion gear for planetary travel about said spur and pinion gear; a pair of an auxiliary spur gears rotatably carried by said disc in spaced relationship, said auxiliary spur gears fixedly carried by said spur gears, respectively; and an output shaft spur gear fixedly carried by said output shaft, with said auxiliary spur gears engaging and traversing said output shaft spur gear in oppositely-disposed relationship, for rotatably driving said disc on said output shaft.

5. The combination chain and gear reducing device of claim 1 wherein said first sprocket includes at least one less tooth than said second sprocket.

6. The combination chain and gear reducing device of claim 1 further comprising oil provided in said housing for lubricating said input gear means, said first sprocket, said second sprocket, said chains and said double sprocket.

7. The combination chain and gear reducing device of claim 6 further comprising at least on oil drip tip provided in the top of said housing for receiving said oil and dripping said oil on said input gear means, said first sprocket, said second sprocket, said chains and said double sprocket.

8. The combination chain and gear reducing device of claim 7 wherein said input gear means further comprises a spur and pinion gear fixedly attached to said input shaft; a pair of spur gears engaging said spur and pinion gear for planetary travel about said spur and pinion gear; a pair of auxiliary spur gears rotatably carried by said disc in spaced relationship, said auxiliary spur gears fixedly carried by said spur gears, respectively; and an output shaft spur gear fixedly carried by said output shaft, with said auxiliary spur gears engaging and traversing said output shaft spur gear in oppositely-disposed relationship, for rotatably driving said disc on said output shaft.

9. The combination chain and gear reducing device of claim 8 wherein said first sprocket includes at least one more tooth than said second sprocket.

10. The combination chain and gear reducing device of claim 8 wherein said first sprocket includes at least one less tooth than said second sprocket.

11. The combination chain and gear reducing device of claim 1 wherein said at least one double sprocket further comprises a pair of double sprockets rotatably carried by said disc in spaced relationship and said chains ar leaf chains.

12. The combination chain and gear reducing device of claim 11 wherein said input gear means further comprises a spur and pinion gear fixedly attached to said input shaft; a pair of spur gears engaging said spur and pinion gear for planetary travel about said spur and pinion gear; a pair of auxiliary spur gears rotatably carried by said disc in spaced relationship, said auxiliary spur gears fixedly carried by said spur gears, respectively; and an output shaft spur gear fixedly carried by said output shaft, with said auxiliary spur gears engaging and traversing said output shaft spur gear in oppositely-disposed relationship, for rotatably driving said disc on said output shaft.

13. The combination chain and gear reducing device of claim 12 wherein said first sprocket includes at least one more tooth than said second sprocket.

14. The combination chain and gear reducing device of claim 12 wherein said first sprocket includes at least one less tooth than said second sprocket.

15. The combination chain and gear reducing device of claim 1 further comprising chain tensioning means carried by said disc and contacting said chains for maintaining a selected tension in said chains.

16. The combination chain and gear reducing device of claim 15 wherein:
   (a) said chains are leaf chains; and
   (b) said input gear means further comprises a spur and pinion gear fixedly attached to said input shaft; a pair of spur gears engaging said spur and pinion gear for planetary travel about said spur and pinion gear; a pair of auxiliary spur gears rotatably carried by said disc in spaced relationship, said auxiliary spur gears fixedly carried by said spur gears, respectively; and an output shaft spur gear fixedly carried by said output shaft, with said auxiliary spur gears engaging and traversing said output shaft spur gear in oppositely-disposed relationship, for rotatably driving said disc on said output shaft.

17. The combination chain and gear reducing device of claim 16 further comprising a supply of oil provided in said housing and a plurality of oil drip tips provided in the top of said housing for receiving said oil and dripping said oil on said spur and pinion gear, said spur gears, said auxiliary spur gears, said output spur gear, said first sprocket, said second sprocket, said double sprocket and said chains.

18. The combination chain and gear reducing device of claim 17 wherein said first sprocket includes at least one more tooth than said second sprocket.

19. The combination chain and gear reducing device of claim 17 wherein said first sprocket includes at least one less tooth than said second sprocket.

20. A combination chain and gear reducing device comprising a housing; an input shaft journalled for rotation in one end of said housing and connected to a power source for driving said input shaft in a first selected direction; an output shaft journalled for rotation in the opposite end of said housing in axial alignment with said input shaft, with one end of said input shaft rotatably recessed in a corresponding end of said output shaft; a disc rotatably mounted on said output shaft in said housing; a spur and pinion gear fixedly carried by said input shaft inside said housing between said disc and said on end of said housing; a pair of spur gears rotatably carried by said disc in spaced relationship, said spur gears engaging said spur and pinion gear in oppositely-disposed relationship, whereby said spur gears traverse said spur and pinion gear in planetary travel in a direction opposite to said first selected direction; a pair of auxiliary spur gears fixedly carried by said spur gears; an output shaft spur gear fixedly carried by said output shaft and engaging said auxiliary spur gears, whereby said auxiliary spur gears traverse said output shaft spur gear in said direction opposite to said first selected direction responsive to planetary traversal of said spur and pinion gear by said spur gears; a first sprocket fixedly carried by said output shaft between said disc and said opposite end of said housing; a second sprocket fixedly carried by said opposite end of said housing, said second sprocket having a different number of teeth from said first sprocket and rotatably receiving said output shaft; a pair of double sprockets rotatably carried by said disc in spaced relationship; and a pair of chains connecting said double sprockets to said first sprocket and said second sprocket respectively, whereby said disc, said first sprocket and said output shaft are driven in said direction opposite to said first selected direction at a torque determined by said different number of teeth on said first sprocket and said second sprocket, responsive to rotation of said input shaft in said first selected direction.

21. The combination chain and gear reducing device of claim 20 wherein said first sprocket includes at least one more tooth than said second sprocket.

22. The combination chain and gear reducing device of claim 20 wherein said first sprocket includes at least one less tooth than said second sprocket.

23. The combination chain and gear reducing device of claim 20 further comprising oil provided in said housing for lubricating said input gear means, said first sprocket, said second sprocket, said chains and said double sprocket.

24. The combination chain and gear reducing device of claim 23 further comprising at least one oil drip tip provided in the top of said housing for receiving said oil and dripping said oil on said input gear means, said first sprocket, said second sprocket, said chains and said double sprocket.

25. The combination chain and gear reducing device of claim 20 further comprising chain tensioning means carried by said disc and contacting said chains for maintaining a selected tension in said chains.

26. The combination chain and gear reducing device of claim 25 further comprising a supply of oil provided in said housing and a plurality of oil drip tips provided in the top of said housing for receiving said oil and dripping said oil on said spur and pinion gear, said spur gears, said auxiliary spur gears, said output spur gear, said first sprocket, said second sprocket, said double sprocket and said chains 27. The combination chain and gear reducing device of claim 26 wherein said first sprocket includes at least one more tooth than said second sprocket.

28. The combination chain and gear reducing device of claim 26 wherein said first sprocket includes at least one less tooth than said second sprocket.

* * * * *